United States Patent
Suzuki et al.

(10) Patent No.: US 11,912,964 B2
(45) Date of Patent: Feb. 27, 2024

(54) CONTACT LENS TREATMENT SOLUTION

(71) Applicant: NOF CORPORATION, Shibuya-ku (JP)

(72) Inventors: Hirotaka Suzuki, Yokohama (JP); Hiroko Kawasaki, Kawasaki (JP); Shunsuke Sakurai, Yokosuka (JP)

(73) Assignee: NOF CORPORATION, Shibuya-ku (JP)

( * ) Notice: Subject to any disclaimer, the term of this patent is extended or adjusted under 35 U.S.C. 154(b) by 539 days.

(21) Appl. No.: 17/275,955

(22) PCT Filed: Sep. 11, 2019

(86) PCT No.: PCT/JP2019/035676
§ 371 (c)(1),
(2) Date: Mar. 12, 2021

(87) PCT Pub. No.: WO2020/059593
PCT Pub. Date: Mar. 26, 2020

(65) Prior Publication Data
US 2021/0269748 A1 Sep. 2, 2021

(30) Foreign Application Priority Data
Sep. 18, 2018 (JP) .................. 2018-173282

(51) Int. Cl.
*C11D 3/37* (2006.01)
*C08F 120/36* (2006.01)
*C11D 11/00* (2006.01)
*C11D 3/26* (2006.01)
*C11D 3/30* (2006.01)
*C11D 3/36* (2006.01)

(52) U.S. Cl.
CPC .......... *C11D 3/3784* (2013.01); *C08F 120/36* (2013.01); *C11D 3/26* (2013.01); *C11D 3/30* (2013.01); *C11D 3/36* (2013.01); *C11D 3/3761* (2013.01); *C11D 3/3769* (2013.01); *C11D 3/3773* (2013.01); *C11D 11/0017* (2013.01); *C08F 2800/10* (2013.01)

(58) Field of Classification Search
CPC .... C11D 3/26; C11D 3/30; C11D 3/36; C11D 3/3761; C11D 3/3769
USPC ........ 510/112, 467, 475, 499, 504, 505, 506
See application file for complete search history.

(56) References Cited

U.S. PATENT DOCUMENTS

2006/0217276 A1* 9/2006 Mitani .................. A61L 12/142
510/112
2019/0023891 A1* 1/2019 Chang .................. C08F 230/02

FOREIGN PATENT DOCUMENTS

| CN | 102822725 A | 12/2012 |
|---|---|---|
| CN | 103459442 A | 12/2013 |
| EP | 2 821 841 A1 | 1/2015 |
| JP | 1-180515 A | 7/1989 |
| JP | 7-166154 A | 6/1995 |
| JP | 2000-147442 A | 5/2000 |
| JP | 2007-86389 A | 4/2007 |
| JP | 2009-136749 A | 6/2009 |
| JP | 2016-35497 A | 3/2016 |
| JP | 2016-113437 A | 6/2016 |
| KR | 96-10699 B1 | 8/1996 |
| TW | 201827892 A | 8/2018 |

OTHER PUBLICATIONS

Combined Taiwanese Notice of Allowance and Search Report dated Apr. 19, 2023 in Taiwanese Application No. 108133428, citing documents 15-16 therein (with English translation of Search Categories), 7 pages.
Extended European Search Report dated May 25, 2022 in European Patent Application No. 19863184.8, citing references AO-AQ therein, 5 pages.
International Search Report dated Nov. 5, 2019 in PCT/JP2019/035676 filed on Sep. 11, 2019 (1 page, Citing references AR-AS therein).
Indian Office Action dated Jan. 25, 2023 in Indian Patent Application No. 202117010900, citing references 15 and 16 therein, 7 pages.

\* cited by examiner

Primary Examiner — Gregory R Delcotto
(74) Attorney, Agent, or Firm — Oblon, McClelland, Maier & Neustadt, L.L.P.

(57) ABSTRACT

The present invention is a contact lens treatment solution containing the following copolymer A and copolymer B in a ratio of A/B=1000/1 to 2/1 (by weight). According to the present invention, there can be provided a contact lens treatment solution capable of removing dirt having adhered to contact lens surfaces and capable of imparting persisting hydrophilicity to contact lens surfaces, by simple immersion treatment.

Copolymer A: a copolymer obtained by copolymerization of a monomer (a) represented by formula (1) and a monomer (b) represented by formula (2), in which the copolymerization ratio of the monomer (a) to the monomer (b), a/b=7/3 to 9/1 (by mol), and having a weight-average molecular weight of 400,000 to 700,000.

Copolymer B: a copolymer obtained by copolymerization of a monomer (c) represented by formula (3) and a monomer (d) represented by formula (4), in which the copolymerization ratio of the monomer (c) to the monomer (d), c/d=1/4 to 9/1 (by mol), and having a weight-average molecular weight of 20,000 to 90,000.

2 Claims, No Drawings

CONTACT LENS TREATMENT SOLUTION

TECHNICAL FIELD

The present invention relates to a contact lens (CL) treatment solution. More precisely, the present invention relates to a CL treatment solution that can remove dirt having adhered to CL, and can impart persisting hydrophilicity to CL surfaces, and relates to CL treated with the CL treatment solution.

BACKGROUND ART

Generally in wearing contact lenses, dirt of proteins, lipids and others derived from tear glands, eye discharges, sebum, cosmetics and the like may be deposited thereon, and such dirt may often worsen the wearability, lower the corrected eyesight, and cause infectious diseases. Therefore, various measures against CL dirtiness have been developed.

As approaches heretofore taken for removing dirt having adhered to CL, a method of washing CL with a detergent that contains a surfactant, an oxidizing agent and a polishing agent is widely used. Further, as typified by PTL 1, a method of adding an enzyme to a CL detergent to efficiently remove dirt from contact lenses is also widely used. In these approaches, the essential theme is to remove dirt having adhered to CL, which, however, could not attain a sufficient effect in prevention of dirt adhesion to CL.

As opposed to these, an approach of hydrophilizing CL surfaces is known as an approach for preventing dirt adhesion to CL. For example, PTL 2 proposes a method of hydrophilizing the surface of CL, using a solution that contains a phosphorylcholine group-containing polymer. However, the essential theme of the method is to prevent adhesion of dirt to CL, by which, therefore, a sufficient effect in removing dirt having adhered to CL could not be attained.

As an approach of satisfying both removal of dirt having adhered to CL and prevention of dirt adhesion to CL, PTL 3 proposes a CL treatment solution that contains a phosphorylcholine group-containing polymer, an alkylamide polyoxyethylene ether sulfate salt, and a hydrolase in a specific ratio. Using the treatment solution, dirt of proteins and lipids can be removed, and additionally adsorption of dirt of proteins and lipids can be prevented by imparting hydrophilicity to CL surfaces.

CITATION LIST

Patent Literature

PTL 1: JP 1-180515 A
PTL 2: JP 7-166154 A
PTL 3: JP 2000-147442 A

SUMMARY OF INVENTION

Technical Problem

The CL treatment solution described in the above-mentioned PTL 3 could be effective to a certain extent for prevention of dirt adhesion to CL and for removal of dirt having adhered to CL, but there still remains room for improvement of persistence of hydrophilicity (persisting hydrophilicity) given to CL surfaces.

An object of the present invention is to provide a CL treatment solution that, by means of a simple immersion process, can remove dirt having adhered to CL surfaces, and can impart persisting hydrophilicity to CL surfaces, and to provide CL treated with the CL treatment solution.

Solution to Problem

Taking the above-mentioned problems into consideration, the present inventors have made assiduous studies and, surprisingly as a result, have found that the problems can be solved by using specific two kinds of copolymers in a specific ratio, and have completed the present invention.

Specifically, the present invention is a CL treatment solution and CL of the following [1] and [2].

[1] A CL treatment solution containing the following copolymer A and copolymer B in a ratio of A/B=1000/1 to 2/1 (by weight):

Copolymer A: a copolymer obtained by copolymerization of a monomer (a) represented by the following formula (1) and a monomer (b) represented by the following formula (2), in which the copolymerization ratio of the monomer (a) to the monomer (b), a/b=7/3 to 9/1 (by mol), and having a weight-average molecular weight of 400,000 to 700,000;

Copolymer B: a copolymer obtained by copolymerization of a monomer (c) represented by the following formula (3) and a monomer (d) represented by the following formula (4), in which the copolymerization ratio of the monomer (c) to the monomer (d), c/d=1/4 to 9/1 (by mol), and having a weight-average molecular weight of 20,000 to 90,000;

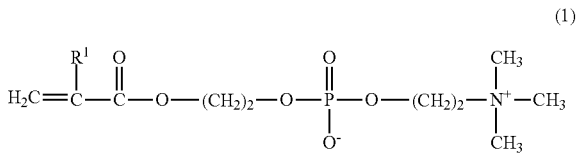

(1)

wherein $R^1$ represents a hydrogen atom or a methyl group;

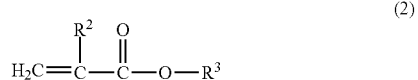

(2)

wherein $R^2$ represents a hydrogen atom or a methyl group, and $R^3$ represents an alkyl group having 2 to 6 carbon atoms;

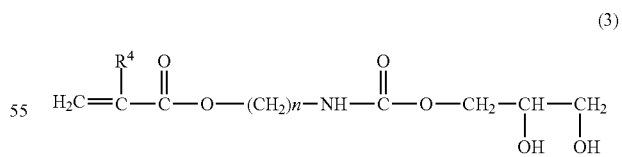

(3)

wherein $R^4$ represents a hydrogen atom or a methyl group, and n represents an integer of 1 to 4,

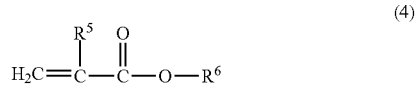

(4)

wherein $R^5$ represents a hydrogen atom or a methyl group, and $R^6$ represents a hydrocarbon group having 8 to 22 carbon atoms.

[2] A contact lens treated with the contact lens treatment solution of [1].

Advantageous Effects of Invention

According to the present invention, there can be provided a CL treatment solution that, by means of a simple immersion process, can remove dirt having adhered to CL surfaces, and can impart persisting hydrophilicity to CL surfaces, and also CL treated with the CL treatment solution.

DESCRIPTION OF EMBODIMENTS

Hereinunder the present invention is described in more detail.

In this description, "(meth)acrylic acid" means "acrylic acid or methacrylic acid", and the same shall apply to other similar terms.

Also in this description, in the case where a preferred numerical range (for example, a range of content or weight-average molecular weight) is expressed in stages, the lower limit and the upper limit in each stage can be independently combined. For example, in a description of "preferably 10 to 100, more preferably 20 to 90", "a preferred lower limit: 10" and "a more preferred upper limit: 90" can be combined to be a range "10 to 90".

The CL treatment solution of the present invention contains the following copolymer A and copolymer B in a ratio of A/B=1000/1 to 2/1 (by weight):

Copolymer A: a copolymer obtained by copolymerization of a monomer (a) represented by the following formula (1) and a monomer (b) represented by the following formula (2), in which the copolymerization ratio of the monomer (a) to the monomer (b), a/b=7/3 to 9/1 (by mol), and having a weight-average molecular weight of 400,000 to 700,000;

Copolymer B: a copolymer obtained by copolymerization of a monomer (c) represented by the following formula (3) and a monomer (d) represented by the following formula (4), in which the copolymerization ratio of the monomer (c) to the monomer (d), c/d=1/4 to 9/1 (by mol), and having a weight-average molecular weight of 20,000 to 90,000;

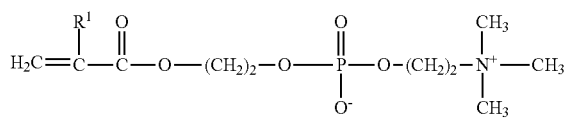
(1)

wherein $R^1$ represents a hydrogen atom or a methyl group;

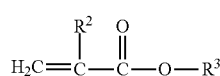
(2)

wherein $R^2$ represents a hydrogen atom or a methyl group, and $R^3$ represents an alkyl group having 2 to 6 carbon atoms;

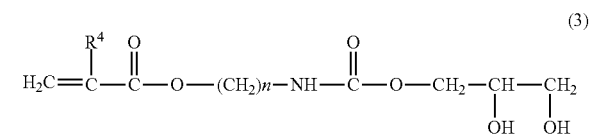
(3)

wherein $R^4$ represents a hydrogen atom or a methyl group, and n represents an integer of 1 to 4,

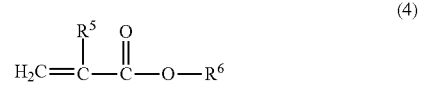
(4)

wherein $R^5$ represents a hydrogen atom or a methyl group, and $R^6$ represents a hydrocarbon group having 8 to 22 carbon atoms.

[Copolymer A]

The copolymer A in the present invention is a copolymer of a monomer (a) represented by the formula (1) and a monomer (b) represented by the formula (2).

$R^1$ of the monomer (a) represented by the formula (1) is a hydrogen atom or a methyl group, and is preferably a methyl group from the viewpoint of raw material availability.

$R^2$ of the monomer (b) represented by the formula (2) is a hydrogen atom or a methyl group, and is preferably a methyl group from the viewpoint of storage stability of the copolymer A.

$R^3$ is an alkyl group having 2 to 6 carbon atoms. Accordingly, preferred examples of the monomer (b) include ethyl (meth)acrylate, propyl (meth)acrylate, butyl (meth)acrylate, pentyl (meth)acrylate, and hexyl (meth)acrylate. Especially highly effective for imparting persisting hydrophilicity to CL, $R^3$ in the formula (2) of the monomer (b) is preferably an alkyl group having 3 to 5 carbon atoms, and above all, butyl (meth)acrylate is more preferred and butyl methacrylate is especially preferred.

In the copolymer A in the present invention, the copolymerization ratio of the monomers (a) and (b) is a/b=7/3 to 9/1 (by mol). Such a range facilitates impartation of persisting hydrophilicity to CL surfaces. The copolymerization ratio of the monomers (a) and (b) in the copolymer A is preferably a/b=3/1 to 4/1.

The copolymerization ratio of the monomers in the copolymer A in the present invention and in the copolymer B to be described below means a molar ratio of the structural unit derived from each monomer in the copolymer. The copolymerization ratio generally corresponds to the ratio of the charged amount of each monomer in polymerization to give the copolymer.

The copolymer A in the present invention contains a structural unit (of the following formula (5)) derived from the monomer (a) described above, and a structural unit (of the following formula (6)) derived from the monomer (b). The copolymer A in the present invention may be composed of the monomer (a)-derived structural unit and the monomer (b)-derived structural unit alone, or may contain any other structural unit than these, but is preferably composed of the monomer (a)-derived structural unit and the monomer (b)-derived structural unit alone.

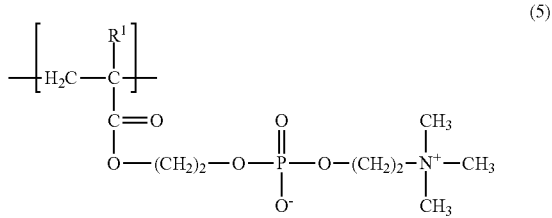

wherein $R^1$ represents a hydrogen atom or a methyl group.

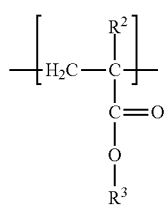

wherein $R^2$ represents a hydrogen atom or a methyl group, and $R^3$ represents an alkyl group having 2 to 6 carbon atoms.

The weight-average molecular weight of the copolymer A in the present invention is 400,000 to 700,000, preferably 500,000 to 700,000, more preferably 550,000 to 650,000. By controlling the weight-average molecular weight of the copolymer A to fall within the range, the effect of imparting persisting hydrophilicity to CL is enhanced.

The weight-average molecular weight of the copolymer A and the copolymer B to be described below is a polyethylene glycol-equivalent value measured through GPC (gel permeation chromatography). More specifically, it can be measured through GPC using, for example, EcoSEC System (by Tosoh Corporation).

[Copolymer B]

The copolymer B in the present invention is a copolymer of a monomer (c) represented by the formula (3) and a monomer (d) represented by the formula (4).

$R^4$ of the monomer (c) represented by the formula (3) represents a hydrogen atom or a methyl group, and is, from the viewpoint of enhancing the storage stability of the copolymer B, preferably a methyl group.

In the formula (3), n represents a integer of 1 to 4, and from the viewpoint of raw material availability, n is preferably 1 to 3, more preferably 1 to 2.

$R^5$ of the monomer (d) represented by the formula (4) represents a hydrogen atom or a methyl group, and is, from the viewpoint of enhancing the storage stability of the copolymer B, preferably a methyl group.

$R^6$ in the formula (4) represents a hydrocarbon group having 8 to 22 carbon atoms, and is above all preferably an alkyl group having 8 to 22 carbon atoms. Specifically, such an alkyl group includes an n-octyl group, an n-nonyl group, an n-decyl group, an n-undecyl group, a lauryl group, an n-tridecyl group, a myristyl group, an n-pentadecyl group, a palmityl group, a margaryl group, a stearyl group, an n-nonadecyl group, an arachidyl group, a heneicosyl group, a behenyl group, and isomers thereof. In particular, having a high effect of imparting persisting hydrophilicity to CL, $R^6$ in the formula (4) of the monomer (d) is preferably an alkyl group having 12 to 18 carbon atoms, and above all, monomer (d) is more preferably stearyl (meth)acrylate, and even more preferably stearyl methacrylate.

The copolymerization ratio of the monomers (c) and (d) in the copolymer B is c/d=1/4 to 9/1 (by mol). Such a range facilitates impartation of persisting hydrophilicity to CL surfaces. The copolymerization ratio of the monomers (c) and (d) in the copolymer B is preferably c/d=1/1 to 7/3.

The copolymer B in the present invention contains a structural unit (of the following formula (7)) derived from the monomer (c) and a structural unit (of the following formula (8)) derived from the monomer (d). The copolymer B in the present invention may be composed of the monomer (c)-derived structural unit and the monomer (d)-derived structural unit alone, or may contain any other structural unit than these, but is preferably composed of the monomer (c)-derived structural unit and the monomer (d)-derived structural unit alone.

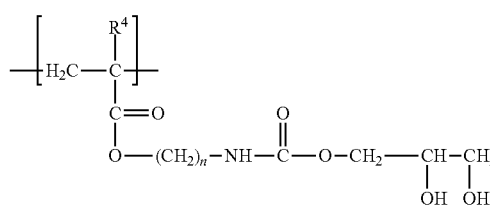

wherein $R^4$ represents a hydrogen atom or a methyl group, and n represents an integer of 1 to 4,

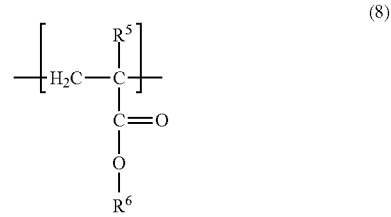

wherein $R^5$ represents a hydrogen atom or a methyl group, and $R^6$ represents a hydrocarbon group having 8 to 22 carbon atoms.

The weight-average molecular weight of the copolymer B is 20,000 to 90,000, preferably 25,000 to 80,000, more preferably 40,000 to 60,000. By controlling the weight-average molecular weight of the copolymer B to fall within the range, the effect of imparting persisting hydrophilicity to CL is enhanced.

[Content of Copolymer A and Copolymer B]

The CL treatment solution of the present invention contains the copolymer A and the copolymer B in a ratio of A/B=1000/1 to 2/1 (by weight).

When the weight ratio of the copolymer A and the copolymer B falls outside the range, for example, when the amount of the copolymer B is too small, the effect of imparting persisting hydrophilicity to CL surfaces may lower, and when the amount of the copolymer B is too large, it is uneconomical since an effect commensurate with the added amount could not be attained.

The CL treatment solution of the present invention is, from the viewpoint of enhancing the effect of imparting persisting hydrophilicity to CL surfaces, preferably such that the copolymer A and the copolymer B therein are in a ratio of A/B=1000/1 to 10/1 (by weight), more preferably A/B=100/1 to 10/1 (by weight).

In the present invention, the two kinds of copolymers are used in the ratio mentioned above to impart persisting hydrophilicity to CL. Though the whole picture of the principle is not as yet clarified, it is presumed that the copolymer B may preferentially fix on CL surfaces to form a matrix thereon thereby playing a role of holding the copolymer A on CL surfaces.

The total content of the copolymer A and the copolymer B in the CL treatment solution of the present invention is preferably 0.01 to 5.0% by weight in the total amount of the CL treatment solution, more preferably 0.1 to 1.0% by weight. The content of 0.01% by weight or more can readily attain a sufficient persisting hydrophilicity-imparting effect, and the content of 5.0% by weight or less is economical since the effect commensurate with the added amount can be attained.

[Production Method for Copolymer]

As the polymerization method for producing the copolymer A and the copolymer B in the present invention, employable is a known method of solution polymerization, bulk polymerization, emulsion polymerization or suspension polymerization, and, for example, employable is a method of radical polymerization of polymerizing monomers in a solvent in the presence of a polymerization initiator.

The initiator for polymerization may be any commonly used initiator, and for example, for radical polymerization, an aliphatic azo compound and an organic oxide can be used. Examples of the polymerization initiator include 2,2'-azobisisobutyronitrile, azobisisodimethylvaleronitrile, benzoyl peroxide, lauroyl peroxide, diisopropylperoxy dicarbonate, t-butylperoxy 2-ethylhexanoate, t-butylperoxy pivalate, t-butylperoxy diisobutyrate, and persulfates such as potassium persulfate and ammonium persulfate. Two or more kinds of these polymerization initiators may be used as mixed. Along with a polymerization initiator, a redox radical accelerator may be used.

The polymerization temperature is preferably 30 to 80° C., more preferably 40 to 70° C. The polymerization time is preferably 2 to 72 hours. This is for favorably promoting polymerization. Further, for smoothly carrying out polymerization, a solvent may be used. The solvent includes water, methanol, ethanol, propanol, t-butanol, benzene, toluene, dimethylformamide, tetrahydrofuran, dioxane, chloroform, and mixed solvents of these.

[Preparation of CL Treatment Solution]

The CL treatment solution of the present invention can be prepared by mixing the above-mentioned copolymer A and copolymer B in a solvent. The solvent for use in the present invention may be arbitrarily selected from those capable of dissolving or stably dispersing the copolymer A and the copolymer B and having few influences on CL. Preferred examples of such solvents include water such as pure water, and solvents that have a property of miscibility with water in any ratio, such as ethanol, isopropanol, ethylene glycol, propylene glycol or glycerin, and mixed solvents of these.

In addition to the copolymer A and the copolymer B, a surfactant is preferably incorporated in the CL treatment solution of the present invention for enhancing detergency and the like. The surfactant can be selected in any desired manner from those not detracting from the advantageous effects of the present invention.

Examples of such surfactants include anionic surfactants such as polyoxyethylene alkyl ether sulfates, polyoxyethylene fatty acid amide ether sulfates, N-acyl-N-methyltaurinates, alkyl sarcosinates, alkylamide sulfosuccinates, alkyl sulfates, dialkyl sulfosuccinates, and N-alkyl-N,N-dimethyloxides; nonionic surfactants such as sorbitan fatty acid esters, and polyoxyethylene hydrogenated castor oil; and ampholytic surfactants such as alkyldimethylaminoacetic acid betaine, 2-alkyl-N-carboxymethyl-N-hydroxyethylimidazolium betaine, alkylamidepropyl betaine, and alkylaminodiacetates. Above all, from the viewpoint of high detergency, few influences on eyes and solution stability, anionic surfactants are preferred, and polyoxyethylene alkyl ether sulfates or polyoxyethylene fatty acid amide ether sulfates are especially preferably used. Specifically, they include polyoxyethylene coconut oil fatty acid monoethanolamide sulfates, lauric acid amide ether sulfate ester salts, myristic acid amide ether sulfate ester salts, and mixtures thereof.

The content of the surfactant in the CL treatment solution of the present invention is preferably 0.01 to 5% by weight in the overall amount of the CL treatment solution, more preferably 0.1 to 2.0% by weight. When the content is 0.01 to 5.0% by weight or less, sufficient detergency can be attained.

In addition to the copolymer A and the copolymer B, the CL treatment solution of the present invention preferably contains a hydrolase for the purpose of decomposing dirt on CL. For the hydrolase, any generally-known hydrolase can be appropriately selected and used within a range not overstepping the object of the present invention. Specifically, the hydrolase can be arbitrarily selected from those capable decomposing tough dirt that could not be removed by surfactant, without having any influence on the properties of CL.

In particular, tear-derived dirt ingredients include glycoproteins such as mucin, proteins such as lysozyme and lipids, and hydrolases having an effect of decomposing these to facilitate removal of dirt on CL are preferably used. Examples of these hydrolases include proteases such as "Bioprase" (by Nagase ChemteX Corporation), "Protease CL-15" (by Nagase ChemteX Corporation), "Clear Lens Pro" (by Novozymes Corporation), "Esperase CLC" (by Novozymes Corporation); lipolytic enzymes such as lipase, phospholipase A, phospholipase B, phospholipase C, phospholipase D and cholesterol esterase; carbohydrate chain degrading enzymes such as α-amylase, endoglycosidase D, endo-ß-galactosidase, ß-galactosidase, cellulase, and dextranase.

The content ratio of the hydrolase in the treatment solution of the present invention is preferably $10^{-10}$% by weight to 1% by weight, more preferably $10^{-16}$% by weight to 0.1% by weight in the entire amount of the CL treatment solution. When the content ratio is $10^{-10}$% by weight to 1% by weight, sufficient detergency can readily be attained.

In addition to the copolymers A and B, the CL treatment solution of the present invention preferably contains a buffering solution for the purpose of maintaining the pH of the solution. The buffering solution can be arbitrarily selected from any one not detracting from the advantageous effects of the present invention, and preferred examples thereof include buffering solutions that are prepared using any of hydrochloric acid, acetic acid, citric acid, boric acid, phosphoric acid, sodium hydroxide, potassium hydroxide, triethanolamine, tris(hydroxymethyl)aminomethane, salts thereof, and mixtures thereof according to an ordinary method.

In addition to the copolymers A and B, the CL treatment solution of the present invention may contain a chelating agent for the purpose of stabilizing the solution and removing metal salts on CL surfaces. The chelating agent can be arbitrarily selected form those not detracting from the advantageous effects of the present invention, and preferred examples thereof include polycarboxylic acids such as citric acid, ethylenediaminetetraacetic acid and cyclohexadiamine tetraacetic acid, and alkali metal salts thereof, and mixtures thereof.

In addition to the copolymers A and B, the CL treatment solution of the present invention may contain an inorganic salt for the purpose of reducing influences on eyes and for tonicity adjustment. The inorganic salt can be arbitrarily selected from any one not overstepping the object of the present invention, and preferred examples thereof include sodium chloride, potassium chloride, magnesium chloride and mixtures thereof.

In addition to the copolymers A and B, a water-soluble polymer compound may be added to the CL treatment solution of the present invention for the purpose of controlling the viscosity of the solution. The compound can be arbitrarily selected from those not detracting from the function of the present invention, and examples thereof include polyethylene glycol, polypropylene glycol, polyvinyl alcohol, polyvinyl pyrrolidone, carboxymethyl cellulose, hydroxyethyl cellulose, hydroxypropylmethyl cellulose, polyethylene oxide-polypropylene oxide block copolymer, maleic anhydride-methyl vinyl ether copolymer, and mixtures thereof.

The CL treatment solution of the present invention may contain a preservative for the purpose of preventing growth of bacteria. For example, as the preservative, chlorobutanol, benzalkonium chloride, thimerosal, chlorohexidine gluconate, paraoxybenzoate, and polyhexamethylene biguanide are preferably added.

Regarding use of the CL treatment solution of the present invention, a method of immersing CL in the CL treatment solution or bringing CL into contact with the CL treatment solution is employable. Subsequently, before wearing them, preferably, CL are rinsed with water, a physiological saline solution and/or an appropriate cleaning solution. In that manner, by using the CL treatment solution, dirt having adhered to CL surfaces can be removed, and further, persisting hydrophilicity can be given to CL to prevent adhesion of dirt of proteins, lipids and the like to CL.

In addition, according to the method, CL treated with the CL treatment solution of the present invention can be readily obtained.

The CL treatment solution of the present invention is favorably used for any of hard CL, soft CL, and other generally-known CL to give CL treated with the CL treatment solution of the present invention in a simple manner.

EXAMPLES

Hereinunder the present invention is described in more detail with reference to Examples, to which, however, the present invention is not limited.

<Synthesis of Copolymer>

Four types of copolymers for use in Examples and Comparative Examples were synthesized. Four types of copolymers shown in Table 1, that is, a copolymer 1 of the copolymer A, copolymer 2 of the copolymers B, and copolymers 3 and 4 of other copolymers than the copolymers A and B were synthesized.

<Synthesis of Monomer (GMU)>

Glycerol-1-methacryloyloxyethylurethane (hereinafter expressed as GMU), a raw material for copolymers 2 and 3 to be mentioned below, was synthesized according to the following method. 330 g of (R,S)-1,2-isopropylidene glycerol and 50 mL of pyridine were put into a 4-neck flask, which was then fitted with a dropping funnel and a calcium tube. At room temperature and under protection from light, 368 g of 2-methacryloyloxyethyl isocyanate was gradually dropwise added. Subsequently, this was reacted at 50° C. for 7 hours. Further, pyridine and excessive (R,S)-1,2-isopropylidene glycerol were evaporated away under reduced pressure to give (R,S)-1,2-isopropylidene glycerol-3-methacryloyloxyethylurethane.

1.96 L of methanol and 50 mL of 4 mol/L hydrochloric acid were added to the resultant (R,S)-1,2-isopropylidene glycerol-3-methacryloyloxyethylurethane, and reacted at room temperature for 1.5 hours. The solvent was evaporated away by drying under reduced pressure to give GMU.

Synthesis Example 1

19.4 g of 2-methacryloyloxyethylphosphorylcholine (hereinafter expressed as MPC), and 2.2 g of butyl methacrylate (hereinafter expressed as BMA) (monomer composition molar ratio: MPC/BMA=8/2) were weighed in a glass flask for polymerization, and as a polymerization initiator, 86 mg of 2,2'-azobisisobutyronitrile (hereinafter expressed as AIBN), and as polymerization solvents, 39.2 g of pure water and 39.2 g of ethanol were added thereto. The reactor was fully purged with nitrogen, and then heated at 60° C. for 5 hours for polymerization. The resultant reaction liquid was cooled with ice, and dropwise put into diethyl ether to precipitate the polymer. The precipitate was filtered out, washed with diethyl ether and then dried in vacuum to give a white solid copolymer 1.

The weight-average molecular weight of the resultant copolymer 1 was determined to be 600,000 as a polyethylene glycol-equivalent one measured through gel permeation chromatography (hereinafter expressed as GPC).

Synthesis Example 2

10.5 g of GMU and 9.5 g of stearyl methacrylate (hereinafter expressed as SMA) (monomer composition molar ratio: GMU/SMA=6/4) were weighed in a glass flask for polymerization, and as a polymerization initiator, 120 mg of AIBN, and as a polymerization solvent, 140 g of ethanol were added thereto. The reactor was fully purged with nitrogen, and then reacted at 60° C. for 8 hours for polymerization. The resultant reaction liquid was cooled with ice, and dropwise put into diethyl ether to precipitate the polymer. The precipitate was filtered out, washed with diethyl ether and then dried in vacuum to give a copolymer 2.

The weight-average molecular weight of the resultant copolymer 2 was determined to be 50,000 as a polyethylene glycol-equivalent one measured through GPC.

Synthesis Example 3

20.0 g of GMU (monomer composition molar ratio: GMU=10) was weighed in a glass flask for polymerization, and as a polymerization initiator, 120 mg of AIBN, and as a polymerization solvent, 140 g of ethanol were added thereto. The reactor was fully purged with nitrogen, and then reacted at 60° C. for 8 hours for polymerization. The resultant reaction liquid was cooled with ice, and dropwise put into diethyl ether to precipitate the polymer. The precipitate was filtered out, washed with diethyl ether and then dried in vacuum to give a copolymer 3.

The weight-average molecular weight of the resultant copolymer 3 was determined to be 72,000 as a polyethylene glycol-equivalent one measured through GPC.

Synthesis Example 4

11.7 g of MPC, and 3.3 g of stearyl methacrylate (hereinafter expressed as SMA) (monomer composition molar ratio: MPC/SMA=8/2) were weighed in a glass flask for polymerization, and as a polymerization initiator, 433 mg of 2,2'-azobisisobutyronitrile (hereinafter expressed as AIBN), and as a polymerization solvent, 84.6 g of ethanol were added thereto. The reactor was fully purged with nitrogen, and then heated at 60° C. for 6 hours for polymerization. The resultant reaction liquid was cooled with ice, and dropwise put into diethyl ether to precipitate the polymer. The precipitate was filtered out, washed with diethyl ether and then dried in vacuum to give a white solid copolymer 4.

The weight-average molecular weight of the resultant copolymer 4 was determined to be 43,000 as a polyethylene glycol-equivalent one measured through GPC.

<GPC Measurement>

The copolymers of Synthesis Examples 1 to 4 were subjected to GPC under the following conditions.

GPC System: High-Performance Liquid Chromatography System CCP & 8020 Series (by Tosoh Corporation).

Columns: Shodex OHpak SB-802.5HQ (by Showa Denko KK) and SB-806HQ (by Showa Denko KK) were connected in series.

Developing solvent: 20 mM sodium phosphate buffer (pH 7.4).

Detector: Differential refractive index detector, UV detector (wavelength 210 nm).

Molecular weight standard: EasiVial PEG/PEO (by Agilent Technologies Corporation).

Flow rate: 0.5 mL/min.

Column temperature: 45° C.

Sample: The resultant copolymer was diluted with the developing solvent to have a final concentration of 0.1% by weight.

TABLE 1

|  |  |  | Synthesis Example 1 Copolymer 1 | Synthesis Example 2 Copolymer 2 | Synthesis Example 3 Copolymer 3 | Synthesis Example 4 Copolymer 4 |
|---|---|---|---|---|---|---|
| Monomer Composition (molar ratio) | Monomer (a) | MPC | 8 | — | — | 8 |
|  | Monomer (b) | BMA | 2 | — | — | — |
|  | Monomer (c) | GMU | — | 6 | 10 | — |
|  | Monomer (d) | SMA | — | 4 | — | 2 |
| Weight-Average Molecular Weight ($\times 10^3$) |  |  | 600 | 50 | 72 | 43 |

Example 1

The copolymer 1 of copolymer A shown in Table 1, the copolymer 2 of copolymer B shown in Table 1, and other components were blended in a ratio shown in Table 3 to prepare a CL treatment solution. The CL treatment solution was evaluated as follows. The results are shown in Table 3.

(I) Detergency Evaluation (Protein Dirt)

In a physiological saline solution containing 0.39% by weight of bovine serum albumin, 0.16% by weight of human γ-globulin, 0.12% by weight of egg-white lysozyme and 0.10% by weight of porcine gastric mucin, contact lenses (Seed Super Hi-O$_2$, by Seed Co., Ltd.) were treated at 60° C. for 2 hours to be contaminated. The lenses were immersed in the CL treatment solution for 4 hours, then rinsed with tap water, and the protein on the lenses were extracted with an aqueous 1% sodium dodecyl sulfate solution, and the extracted amount of the protein was quantified with a micro BCA kit (by Thermo Fisher Scientific KK) ($C_{ps}$). Further, protein quantification was carried out in the same manner as above except that physiological saline water was used in place of the CL treatment solution ($C_{p0}$). According to the following mathematical expression (1), the protein removal ratio was calculated, and the CL treatment solution was evaluated as C: less than 50%, B: 50% or more and less than 70%, and A: 70% or more.

$$\text{Protein Removal Ratio} = \frac{C_{p0} - C_{ps}}{C_{p0}} \times 100(\%) \quad (1)$$

(II) Detergency Evaluation (Lipid Dirt)

In a physiological saline solution in which 0.60% by weight of oleic acid, 0.60% by weight of linolic acid, 0.60% by weight of palmitic acid, 8.12% by weight of tripalmitin, 2.00% by weight of cetyl alcohol, 8.12% by weight of cetyl myristate, 0.80% by weight of cholesterol, 0.80% by weight of cholesterol palmitate, and 28.36% by weight of egg-yolk lecithin had been emulsified, contact lenses (Seed Super Hi-O$_2$, by Seed Co., Ltd.) were treated at 35° C. for 4 hours to be contaminated. The lenses were immersed in the CL treatment solution for 4 hours, then rinsed with tap water, and the lipid on the lenses were extracted with a mixed solvent of chloroform/methanol=1/1 (by volume), and the solvent was evaporated away. The remaining lipid was quantified according to a sulfuric acid-vanillin method ($C_{ls}$).

Further, lipid quantification was carried out in the same manner as above except that physiological saline water was used in place of the CL treatment solution ($C_{l0}$). According to the following mathematical expression (2), the lipid removal ratio was calculated, and the CL treatment solution was evaluated as C: less than 0%, B: 0% or more and less than 40%, and A: 40% or more.

$$\text{Lipid Removal Ratio} = \frac{C_{l0} - C_{ls}}{Q_{l0}} \times 100(\%) \quad (2)$$

(III) Persisting Hydrophilicity

[1] Contact lenses (Hard EX1, by Seed Co., Ltd.) were rinsed with tap water, and immersed and treated overnight in the CL treatment solution. These were rinsed with physiological saline water, and then BUT thereof was measured ($W_{is}$). BUT means a tear break up time, a time (second) taken just after CL were drawn up from physiological saline water and then the CL convex surfaces were observed before no liquid dropping was from CL.

[2] Further, the CL were put into a 12-well plate and immersed in 2 mL of physiological saline water, and shaken for 6 hours (for simulation of a state after wearing). BUT of the CL was measured in the same manner as above ($W_{fs}$).

[3] Further, in the same manner as in the above [1] except that physiological saline water was used in place of the CL treatment solution in the above [1], BUT before immersion for 6 hours in physiological saline water was measured ($W_{i0}$).

[4] According to the following mathematical expressions (3) and (4), the hydrophilicity degree before and after immersion for 6 hours in physiological saline water was calculated, and the CL treatment solution before immersion was evaluated as C: less than 0.7, B: 0.7 or more and less than 1.0, and A: 1.0 or more, and after immersion, as C: less than 0.7, B: 0.7 or more and less than 1.0, and A: 1.0 or more. Further, based on these evaluation data, the persisting hydrophilicity was judged according to Table 2.

$$\text{Hydrophilicity Degree (before immersion)} = \log_{10} \frac{W_{is}}{W_{kl}} \quad (3)$$

$$\text{Hydrophilicity Degree (after immersion)} = \log_{10} \frac{W_{Is}}{W_{I0}} \quad (4)$$

TABLE 2

| | Hydrophilicity Degree (before immersion) | | |
|---|---|---|---|
| | A | B | C |
| Hydrophilicity Degree (after immersion) | A S A B |  |  |
|  | B A B C |  |  |
|  | C B C C |  |  |

Examples 2 to 6

CL treatment solutions each having a composition shown in Table 3 were prepared and evaluated in the same manner as in Example 1. The results are shown in Table 3.

Comparative Examples 1 to 4

CL treatment solutions each having a composition shown in Table 4 were prepared and evaluated in the same manner as in Example 1. The results are shown in Table 4.

TABLE 3

| | | | Examples | | | | | |
|---|---|---|---|---|---|---|---|---|
| | | | 1 | 2 | 3 | 4 | 5 | 6 |
| CL Treatment Solution (% by weight) | Copolymer A | Copolymer 1 | 0.3 | 0.3 | 0.3 | 0.3 | 0.3 | 0.3 |
| | Copolymer B | Copolymer 2 | 0.1 | 0.1 | 0.005 | 0.005 | 0.0005 | 0.0005 |
| | Other Copolymer | Copolymer 3 | — | — | — | — | — | — |
| | | Copolymer 4 | — | — | — | — | — | — |
| | Other Component | Glycerin | | | 5 | | | |
| | | PG | | | 10 | | | |
| | | SPCS | | | 1.4 | | | |
| | | TLS | | | 0.6 | | | |
| | | CLP | 0.02 | — | 0.02 | — | 0.02 | — |
| | | ECLC | — | 0.007 | — | 0.007 | — | 0.007 |
| | | Boric Acid | | | 1.5 | | | |
| | | NaOH | | | 0.6 | | | |
| | | EDTA | | | 0.1 | | | |
| | | Water | | | balance | | | |
| Copolymer A/Copolymer B (by weight) | | | 3/1 | 3/1 | 60/1 | 60/1 | 600/1 | 600/1 |
| Evaluation Results | | Detergency (protein)*1 | A [76%] | A [84%] | A [95%] | A [97%] | A [81%] | A [81%] |
| | | Detergency (lipid)*2 | A [46%] | A [42%] | A [45%] | A [48%] | A [47%] | A [44%] |
| | | Persisting Hydrophilicity*3 | A [1.1/0.7] | A [1.2/0.7] | S [1.4/1.0] | S [1.4/1.0] | S [1.3/1.0] | S [1.4/1.0] |

*1 Protein removal ratio is parenthesized.
*2 Lipid removal ratio is parenthesized.
*3 [Hydrophilicity Degree (before immersion)/Hydrophilicity Degree (after immersion)]

Abbreviations used in Table 3 are as follows.
PG: propylene glycol
SPCS: sodium PEG-4 cocamide sulfate (polyoxyethylene coconut oil fatty acid monoethanolamide sodium sulfate)
TLS: TEA-laureth sulfate (polyoxyethylene lauryl ether sulfate triethanolamine)
CLP: Clear Lens Pro (by Novozymes Corporation)
ECLC: Esperase CLC (by Novozymes Corporation)
NaOH: sodium hydroxide
EDTA: ethylenediaminetetraacetic acid

TABLE 4

|  |  |  | Comparative Example | | | |
|---|---|---|---|---|---|---|
|  |  |  | 1 | 2 | 3 | 4 |
| CL Treatment Solution (% by weight) | Copolymer A | Copolymer 1 | 0.3 | 0.5 | 0.3 | 0.3 |
|  | Copolymer B | Copolymer 2 | — | — | — | — |
|  | Other Copolymer | Copolymer 3 | — | — | 0.1 | — |
|  |  | Copolymer 4 | — | — | — | 0.3 |
|  | Other Component | Glycerin | | 5 | | |
|  |  | PG | | 10 | | |
|  |  | SPCS | | 1.4 | | |
|  |  | TLS | | 0.6 | | |
|  |  | CLP | | 0.02 | | |
|  |  | ECLC | | — | | |
|  |  | Boric Acid | | 1.5 | | |
|  |  | NaOH | | 0.6 | | |
|  |  | EDTA | | 0.1 | | |
|  |  | Water | | balance | | |
| Copolymer A/Copolymer B (by weight) | | | 1/0 | 1/0 | — | — |
| Evaluation Results | | Detergency (protein)*1 | A [75%] | A [75%] | B [66%] | B [67%] |
|  |  | Detergency (lipid)*2 | B [35%] | B [28%] | B [26%] | A [42%] |
|  |  | Persisting Hydrophilicity*3 | B [1.3/0.6] | B [1.0/0.6] | B [1.0/0.6] | B [0.9/0.7] |

*1 Protein removal ratio is parenthesized.
*2 Lipid removal ratio is parenthesized.
*3 [Hydrophilicity Degree (before immersion)/Hydrophilicity Degree (after immersion)]

Abbreviations used in Table 4 are as follows.
PG: propylene glycol
SPCS: sodium PEG-4 cocamide sulfate (polyoxyethylene coconut oil fatty acid monoethanolamide sodium sulfate)
TLS: TEA-laureth sulfate (polyoxyethylene lauryl ether sulfate triethanolamine)
CLP: Clear Lens Pro (by Novozymes Corporation)
ECLC: Esperase CLC (by Novozymes Corporation)
NaOH: sodium hydroxide
EDTA: ethylenediaminetetraacetic acid The results in Examples and Comparative Examples reveal the following.

Not containing the copolymer B, Comparative Example 1 was inferior to Examples in point of persisting hydrophilicity. Further, Comparative Example 2 was so formulated as to have an increased amount of the copolymer A in place of containing the copolymer B, but was also inferior to Examples in point of persisting hydrophilicity. From these, it is known that for expressing persisting hydrophilicity, it is necessary to add the copolymer B but not to merely increase the amount of the copolymer A.

Comparative Examples 3 and 4 used copolymers 3 and 4, respectively, in place of the copolymer B, which, however were outside the scope of the present invention. Comparative Examples 3 and 4 were also inferior to Examples in point of persisting hydrophilicity. From these, it is known that, as the copolymer B, the copolymer falling within the scope defined in the present specification need to be used.

On the other hand, Examples achieved more excellent effects than Comparative Examples in point of all the evaluation items of detergency (protein), detergency (lipid) and persisting hydrophilicity. Namely, the present invention can provide a CL treatment solution capable of removing dirt having adhered to CL surfaces and capable of imparting persisting hydrophilicity to CL surfaces, by simple immersion treatment.

The invention claimed is:

1. A contact lens treatment solution comprising the following copolymer A and copolymer B in a ratio of A/B=1000/1 to 2/1 by weight:

Copolymer A: a copolymer obtained by copolymerization of a monomer (a) represented by the following formula (1) and a monomer (b) represented by the following formula (2), in which the copolymerization ratio of the monomer (a) to the monomer (b), a/b=7/3 to 9/1 by mol, and having a weight-average molecular weight of 400,000 to 700,000;

Copolymer B; a copolymer obtained by copolymerization of a monomer (c) represented by the following formula (3) and a monomer (d) represented by the following formula (4), in which the copolymerization ratio of the monomer (c) to the monomer (d), c/d=1/4 to 9/1 by mol, and having a weight-average molecular weight of 20,000 to 90,000;

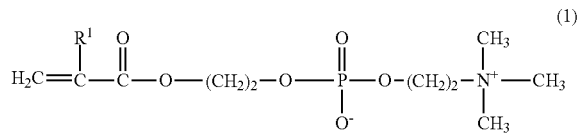

(1)

wherein R¹ represents a hydrogen atom or a methyl group;

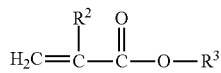

(2)

wherein R² represents a hydrogen atom or a methyl group, and R³ represents an alkyl group having 2 to 6 carbon atoms;

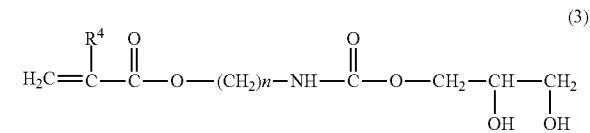

(3)

wherein R⁴ represents a hydrogen atom or a methyl group, and n represents an integer of 1 to 4,

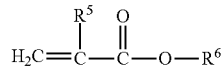

(4)

wherein R⁵ represents a hydrogen atom or a methyl group, and R⁶ represents a hydrocarbon group having 8 to 22 carbon atoms.

2. A method of treating a contact lens, said method comprising contacting said contact lens with the treatment solution of claim 1.

* * * * *